T. G. PLANT.
JACK FOR BOOT AND SHOE LASTS.
APPLICATION FILED JULY 27, 1907. RENEWED APR. 14, 1909.
940,722.
Patented Nov. 23, 1909.
2 SHEETS—SHEET 1.
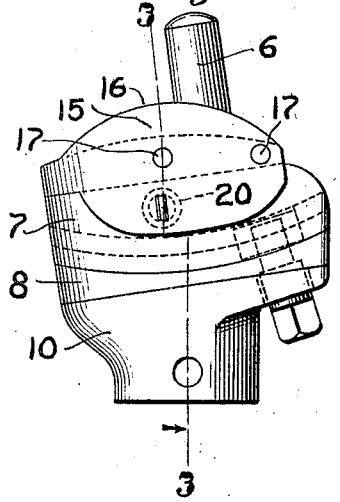
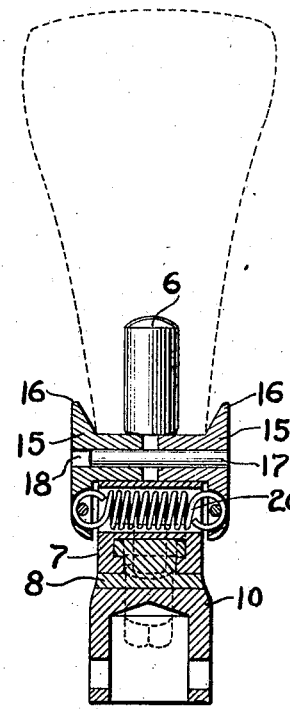
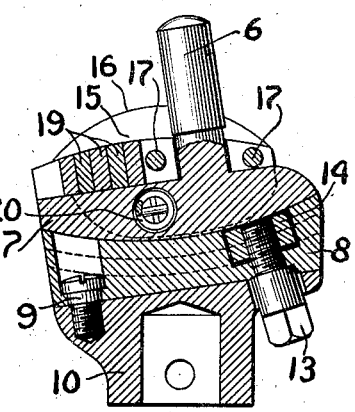
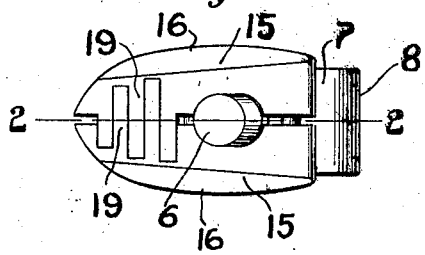
Witnesses:
Edwin T Luce
Horace M Crossman
Inventor:
Thomas G. Plant,
by Robt T Haines
Atty

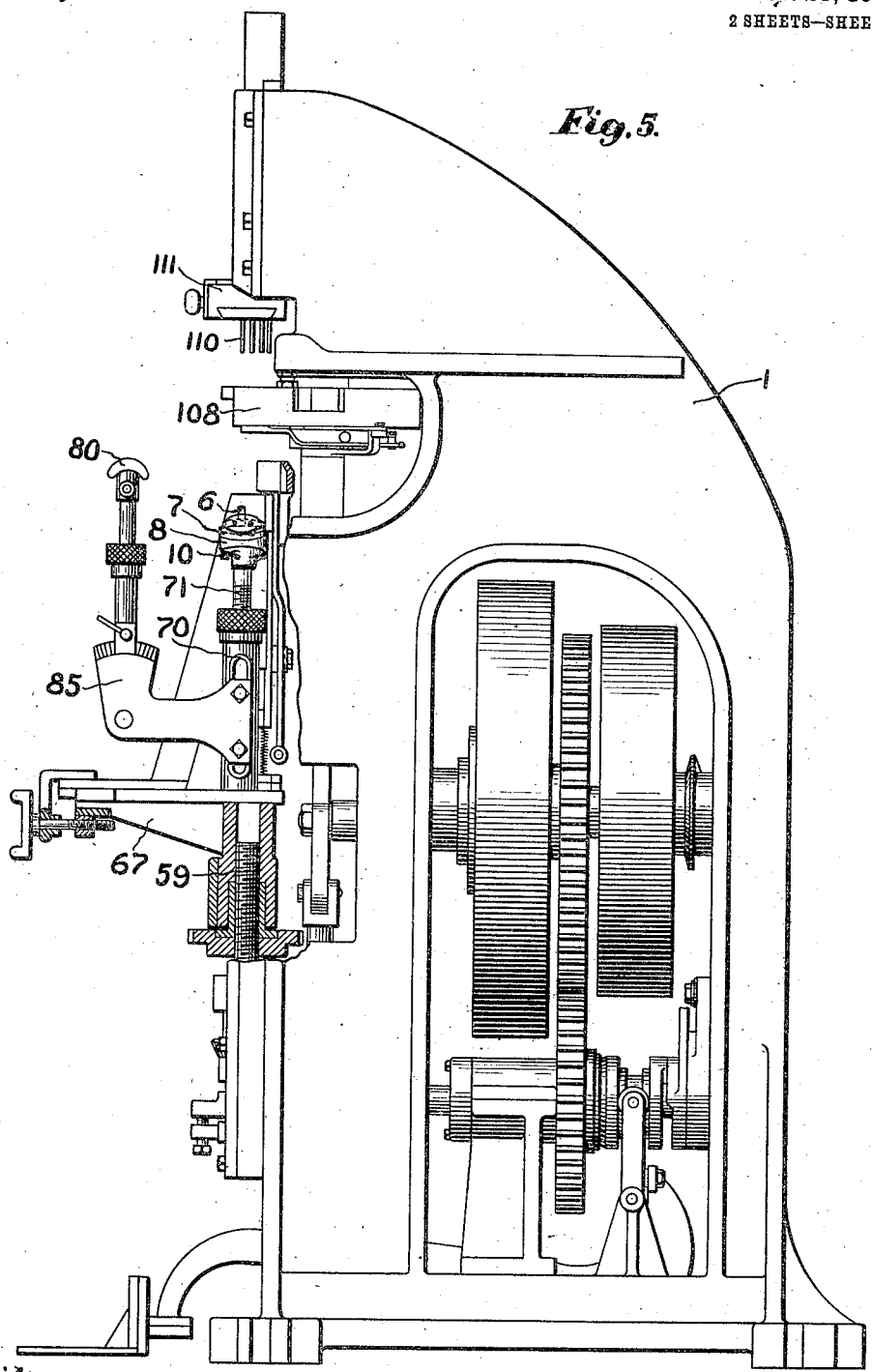

UNITED STATES PATENT OFFICE.

THOMAS G. PLANT, OF BOSTON, MASSACHUSETTS.

JACK FOR BOOT AND SHOE LASTS.

940,722.   Specification of Letters Patent.   Patented Nov. 23, 1909.

Application filed July 27, 1907, Serial No. 385,848. Renewed April 14, 1909. Serial No. 489,887.

*To all whom it may concern:*

Be it known that I, THOMAS G. PLANT, a citizen of the United States, residing at Boston, in the county of Suffolk and State of Massachusetts, have invented an Improvement in Jacks for Boot and Shoe Lasts, of which the following description, in connection with the accompanying drawings, is a specification, like numerals on the drawings representing like parts.

This invention aims to provide an improved jack or work support for boot and shoe lasts employed in the manufacture of boots and shoes.

The invention consists in various features of construction organized to provide a jack of improved form and capacity.

The several features of my invention will be best understood from a description of one embodiment thereof selected for illustration herein and shown in the accompanying drawings.

Referring to said drawings: Figure 1, in side elevation, shows a sufficient portion of a jack illustrating my invention to enable the latter to be understood; Fig. 2, is a vertical, longitudinal section thereof on line 2—2, Fig. 4; Fig. 3, a vertical, transverse section on the irregular dotted line 3—3, Fig. 1; Fig. 4, a plan view of the device shown in Fig. 1; and Fig. 5, a view illustrating one form of machine in which a jack made in accordance with my invention may be used to advantage.

Referring to the drawings, in the particular embodiment of my invention selected for present illustration and there shown, the work support or, the "jack", as I shall hereinafter designate it, for convenience, comprises a last pin 6, of suitable or usual shape and adapted to receive and hold a last or form, such as used in the manufacture of a pair of boots or shoes. Referring to Fig. 2, this last pin is shown erected upon a sliding head 7, segmental in shape and adapted to slide at its under side in dovetailed bearings in the swinging head 8. This latter head is shown as pivoted at 9 to the post or post cap 10, suitably supported upon the bench or in the machine. The swinging head 8 may be swung transversely about its pivot 9, and in any position of the swinging head 8 the sliding head 7 may be moved endwise into one or another position to vary the pitch or rake of the last pin 6. The sliding head may be retained in any longitudinal position to retain the last pin in any position of inclination or rake by suitable means herein and conveniently a clamp screw 13 (Fig. 1), engaging a clamping nut 14 acting in the dovetail groove of said head. The clamping screw 13 may also serve as a means to limit the lateral swing of the head 8 about its pivot 9, said limiting screw traveling between stop surfaces formed in the post cap 10.

Seated upon the sliding head 7 are the separable members 15 of side or transverse supporting means for the last. These side members 15 are shown as crowning at their upper faces (see Figs. 1 and 2) and are provided, respectively, with the upwardly extended flanges or lips 16 shown as beveled at their inner faces (see Fig. 3).. Guide pins 17 in one of said side members play freely in guideways 18 in the other of said members the latter being further interlocked to insure proper alinement during the movement of separation and closing, by interlocking and sliding tongues 19 (see Fig. 4). The sliding tongues also serve to eliminate a continuous line of separation between the two side members such as might promote a rupture of the last, when pressed thereon.

The sliding member 7 is transversely drilled (see Fig. 3) to receive a coil spring 20, attached at its ends to depending lips of the side members 15 and which tends to draw the said members normally toward each other, as shown.

When a last is placed upon the jack, in a manner well understood by those skilled in the art, any pressure or blow tending to seat the last upon the supporting surface at the base of the pin, which surface as here shown comprises the top faces of the separable side members 15, the seating of the last will act upon the inner, oblique faces of the lips 16 of the side members and will cause the latter to separate sufficiently to permit the last to descend to a firm seat and bearing. The degree of separation will of course, vary with the variations in width of the lasts, said members opening always sufficiently to receive the last and no more. When so separated the side members furnish side supports for the sides of the last, thereby assisting in preventing any separation of the sides of the last such as would be necessary to permit a splitting of the same.

In addition to the spring which, as stated, exerts a constant action to prevent the splitting of the last, the downward pressure of the last causes the separable side members to press with increasing pressure and consequent resistance upon the top of the sliding member 7 and, by the increase in frictional contact between the side members and the said sliding head, causes the side members to become locked frictionally against further separation, the result being that the greater the pressure tending to split the last and to spread the said side members the greater will be the resistance imposed upon the side members to prevent separation thereof, the frictional resistance or lock building up progressively with the building up of splitting pressure.

The device as shown thus provides an automatically adjustable and automatically locking support for the sides of the last.

My invention is particularly useful in connection with heeling machines for heeling boots and shoes while upon the wooden lasts upon which they have been lasted and made. While it has always been desirable to heel the shoes upon the original wooden lasts, this has been largely impossible because the great pressure required in nailing a heel in position tends to break down and split the last, and the prevailing custom has been, and now is, to remove the wooden lasts from the shoes and place the latter upon iron lasts for the heeling operation, after which the iron lasts are removed and wooden lasts again inserted.

In Fig. 5 I have typified a heeling machine, in order to show the jack (Figs. 1 to 4, inclusive) in position therein. The frame 1 is provided with a rising and falling table 67, upon which is suitably mounted a jack post 70, having an adjustable stem 71 carrying at its upper end the post head 10 previously referred to. On a bracket 85 projecting from said jack post is mounted the toe pad 80 to support the toe of the shoe when its last is mounted upon the last pin 6. The nail block 108 is shown above the jack and, above the nail block in turn, are the drivers 110 mounted upon the vertically movable driver head 111, adapted to descend and drive the nails down through the nail block into the heel and the shoe sole.

The jack carrying table is arranged to be elevated at the proper times in suitable manner as by the screw 59 to compress the heel and seat it upon the sole preparatory to the nailing, and it is this seating or compressing pressure that is required for good work and which is so damaging to wooden lasts, amounting as it does frequently to a number of tons.

In whatever position the sliding head may be it is capable of being swung about the pivot 9, as stated, which pivot is so positioned in the rear of the last pin that the axis of transverse swing of the shoe as the toe thereof is swung from one to the other side, according as it may be a right or left shoe, may take place without disturbing to any detrimental extent the position of the back seam at the back of the heel of the shoe. The position of the back nail in the heel may thus remain substantially the same whether the last be swung to the right or to the left, thus preserving the proper positioning of the nails in the heels to a degree that is now impossible in jacks where the side swing occurs about an axis in the vicinity of the last pin itself, for in such cases the back of the heel is swung from one to the other side of the central position represented by the nail block above it according to the extent and direction of swing of the toe of the shoe.

It will be observed that the swinging head 8 is mounted to swing in a slightly oblique plane on the top of the post head 10, the plane of the swing being approximately positioned relative to the average position of a last thereon.

My invention is not restricted to the particular embodiment thereof here shown and described nor is it restricted to any particular use, for it may be employed in any manner where found useful.

Claim.

1. A jack provided with last supporting means, said means comprising members constructed and arranged to engage the top or crown of the last and mounted to slide transversely of said jack toward and from each other in automatically adjusting themselves to the last.

2. A jack comprising a head, last supporting members mounted to slide transversely on said head, and yielding means for restraining the sliding separation of said members.

3. A jack provided with last supporting means, said means comprising automatically adjusting members mounted to slide toward and from each other, and said members having provisions for engaging the sides of a last mounted on the jack.

4. A jack comprising a head, and last supporting members constructed and arranged to permit them to slide toward and from each other in conforming themselves to the last, said members being mounted on said head and provided with flanges to engage the outer surface of the last supported on said jack.

5. A jack provided with last supporting means comprising members mounted to slide toward and from each other, means normally acting to force said members toward each other, said members being provided with upwardly projecting flanges having their sides, adjacent the last supported on the jack, inclined.

6. A jack provided with last supporting means comprising members mounted to slide toward and from each other, said members being provided with upwardly projecting flanges having their sides, adjacent the last supported on the jack, inclined, and means acting yieldingly to restrain sliding separation of said members.

7. A jack comprising a head, a last pin projecting therefrom, and last supporting members constructed and arranged to slide transversely of the jack toward and from each other and disposed on different sides of the last pin.

8. As a means for supporting a last during a heeling operation, a support to receive the top of the last, said support comprising members constructed and arranged to slide toward and from each other yieldingly, means to restrain separation thereof, and means for transmitting and distributing the pressure to the sides of the last.

9. A jack comprising a head, a last pin projecting therefrom, last supporting members disposed on opposite sides of said last pin and constructed and arranged to slide transversely of the jack toward and from each other, and provided with means to engage the sides of the last near its points of support.

10. As a means for supporting a last during a heeling operation, a support to receive the top of the last, said support comprising members slidable toward and from each other and provided with means to engage a last as it is seated on the jack to slide said members in a direction of separation, said members being mounted and arranged to be locked from further separation under the pressure of the heeling operation.

11. A jack comprising a swinging head, a sliding head mounted on said swinging head, and a single locking means constructed and arranged for locking both the swinging and sliding heads in desired positions of adjustment.

12. A jack comprising a post cap, a head mounted to swing transversely of said post cap about a pivot adjacent the heel end of the last supported on said jack, a sliding head mounted to slide longitudinally on said swinging head, and locking means for holding said swinging head in position of adjustment.

13. A jack comprising a head mounted to swing transversely in a plane oblique to the vertical and about a point approximate to the rear end of the heel of a last supported on the jack, a sliding head mounted upon said swinging head to slide longitudinally thereon and carrying a last pin, and means for holding the sliding head in position on the swinging head.

14. A jack comprising a head mounted to swing transversely about a point adjacent the heel end of a last mounted on said jack, and a sliding head carrying a last pin and mounted on said swinging head to move toward and from the rear thereof.

15. A jack comprising a head mounted to swing transversely about a point adjacent the heel end of a last mounted on the jack, a sliding head carrying a last pin and mounted to slide on said swinging head, and a last support mounted on said sliding head and having provisions to engage the sides of the last.

16. A jack comprising a head mounted to swing transversely about a point adjacent the heel end of a last mounted on the jack, a sliding head carrying a last pin and mounted to slide longitudinally of said swinging head, and last supporting members mounted to slide toward and from each other on said sliding head, said members having last engaging means constructed and arranged to prevent splitting.

17. A jack comprising a sliding head having a last pin, and a swinging head having a pivotal support disposed to the rear of said last pin, said sliding head being mounted to slide longitudinally on the swinging head.

18. A jack comprising a sliding head having a last pin, and a swinging head having a pivotal support disposed to the rear of said last pin and adjacent the heel end of the last, said sliding head being mounted on the swinging head to slide longitudinally thereon.

19. A jack comprising a sliding head having a last pin, a swinging head having a pivotal support disposed to the rear of said last pin, said sliding head being mounted to slide longitudinally on the swinging head, and last supporting members mounted to slide on said sliding head.

In testimony whereof, I have signed my name to this specification, in the presence of two subscribing witnesses.

THOMAS G. PLANT.

Witnesses:
IRVING U. TOWNSEND,
ANTOINETTE A. BRAUTIGAM.